(12) United States Patent
Wallace

(10) Patent No.: US 7,857,562 B2
(45) Date of Patent: Dec. 28, 2010

(54) DIRECT TENSION INDICATING WASHER HAVING ENHANCED EMISSION OF INDICATING MATERIAL

(76) Inventor: Ivan Wayne Wallace, P.O. Box 686, Walpole, NH (US) 03608

( * ) Notice: Subject to any disclaimer, the term of this patent is extended or adjusted under 35 U.S.C. 154(b) by 256 days.

(21) Appl. No.: 12/049,428

(22) Filed: Mar. 17, 2008

(65) Prior Publication Data

US 2009/0232614 A1 Sep. 17, 2009

(51) Int. Cl.
*F16B 31/02* (2006.01)

(52) U.S. Cl. .............. 411/10; 411/13; 411/14

(58) Field of Classification Search ........ 411/1, 411/5–10, 13, 14, 147, 160, 162; 116/211, 116/212; 73/761
See application file for complete search history.

(56) References Cited

U.S. PATENT DOCUMENTS

| | | | |
|---|---|---|---|
| 3,187,621 A * | 6/1965 | Turner | 411/10 |
| 3,285,120 A * | 11/1966 | Kartiala | 411/8 |
| 3,948,141 A * | 4/1976 | Shinjo | 411/10 |
| 3,960,048 A * | 6/1976 | Wagner | 29/446 |
| 4,157,052 A * | 6/1979 | Kulka | 411/371.2 |
| 5,015,132 A | 5/1991 | Turner et al. | |
| 5,370,483 A | 12/1994 | Hood et al. | |
| 5,487,632 A | 1/1996 | Hood et al. | |
| 5,769,581 A | 6/1998 | Wallace et al. | |
| 5,921,737 A * | 7/1999 | Ibey | 411/535 |
| 5,931,618 A | 8/1999 | Wallace et al. | |
| 6,152,665 A | 11/2000 | Wallace et al. | |
| 6,425,718 B1 | 7/2002 | Herr et al. | |
| 6,582,173 B1 * | 6/2003 | Miller | 411/442 |
| 6,729,819 B2 | 5/2004 | Wallace | |
| 6,824,225 B2 * | 11/2004 | Stiffler | 299/104 |
| 7,635,243 B2 * | 12/2009 | Turner et al. | 411/10 |

* cited by examiner

*Primary Examiner*—Flemming Saether
(74) *Attorney, Agent, or Firm*—Cantor Colburn LLP

(57) ABSTRACT

A direct tension indicating washer including a first surface having a protuberance formed thereon; a second surface having an indentation formed opposite the protuberance; an indicating material positioned in the indentation; and a channel leading from the indentation to an outer diameter of the direct tension indicating washer; wherein the protuberance has four walls, each of the walls being substantially perpendicular to the first surface.

4 Claims, 3 Drawing Sheets

DIRECT TENSION INDICATING WASHER HAVING ENHANCED EMISSION OF INDICATING MATERIAL

BACKGROUND

The invention relates in general to direct tension indicating washers and in particular to direct tension indicating washers that indicate when the proper bolt tension has been achieved.

Direct tension indicating (DTI) washers are used in the art to indicate when proper bolt tension has been reached. U.S. Pat. No. 5,931,618, the entire contents of which are incorporated herein by reference, discloses an exemplary DTI. FIG. 1 is a top view of the DTI from U.S. Pat. No. 5,931,618. A direct tension indicating washer 60 includes protuberances 12 formed on a first surface 14 and corresponding indentations 16 formed on a second surface 18. The direct tension indicating washer 60 also includes channels 62 that lead from each indentation 16 to the outer diameter of the direct tension indicating washer 60. The indentation 16 is filled with an indicating material 64. The direct tension indicating washer 60 is manufactured using a tool and die to stamp the protuberances 12, indentations 16 and channels 62 into a blank washer. Other processes, such as metal machining or metal casting may be used to form the direct tension indicating washer 60. Direct tension indicating washer 60 is made from carbon steel, but stainless steel, nonferrous metals, and other alloy products may also be used. The indicating material 64 is an extrudable, elastomeric solid material such as colored silicone. FIG. 2 is a cross-sectional view taken along line 2-2 of FIG. 1. FIG. 3 illustrates the protuberances before installation and after installation illustrating the compression of a protuberance 12, which forces indicating material 64 out channel 62 to the periphery of the direct tension indicating washer 60.

While the direct tension indicating washer of FIGS. 1-3 is well suited for its intended purposes, it has been discovered that a more prominent exodus of indicating material 64 from channel 62 is desirable. Pending U.S. patent application Ser. No. 11/875,224, the entire contents of which are incorporated herein by reference, discloses a direct tension indicating washer having a modified indicating material to provide a more prominent exodus of indicating material (also referred to as a "squirt event"). While this design is well suited for its intended purpose, there is a need to further improve the exodus of indicating material from the channel.

SUMMARY

Embodiments of the invention include a direct tension indicating washer including a first surface having a protuberance formed thereon; a second surface having an indentation formed opposite the protuberance; an indicating material positioned in the indentation; and a channel leading from the indentation to an outer diameter of the direct tension indicating washer; wherein the protuberance has four walls, each of the walls being substantially perpendicular to the first surface.

BRIEF DESCRIPTION OF THE DRAWINGS

Referring now to the drawings wherein like elements are numbered alike in the several Figures.

DETAILED DESCRIPTION

One issue with direct tension indicating (DTI) washers loaded with indicating material is that when the DTI protuberances 12 get too small, or low, relative to the indentation 16 depth under them, when used to expel indicating material 64, the compression of the small protuberances 12 sometimes does not result in sufficient deformation of the indentation 16 cavity to eject indicating material 64 in a reliable manner.

Figure 4:
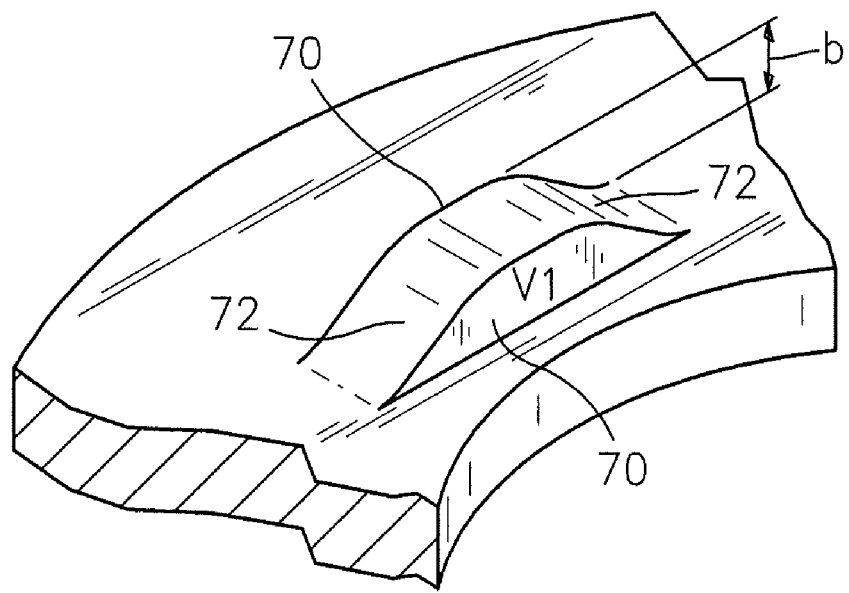
FIG. 4 is a perspective view of a conventional protuberance.

FIG. 4 illustrates a conventional protuberance 12. The protuberance 12 is formed using a punch driven into the bottom surface of the DTI 60 and a die on the top surface of the DTI. The die has two walls, which results in protuberance 12 having two sides 70 that are substantially planar and substantially perpendicular to the top surface of the DTI. The remaining sides 72 of the protuberance are arcuate and meet at an apex of the protuberance.

Figure 1:
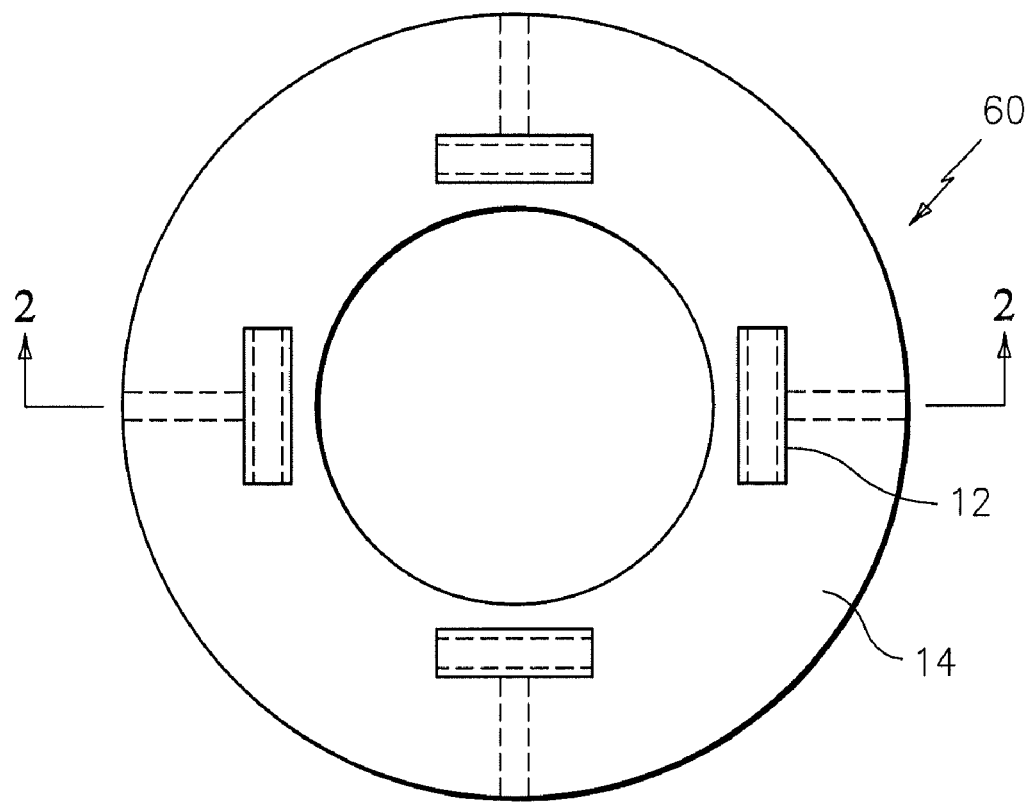
FIG. 1 is a top view of a conventional direct tension indicating washer.
Figure 2:
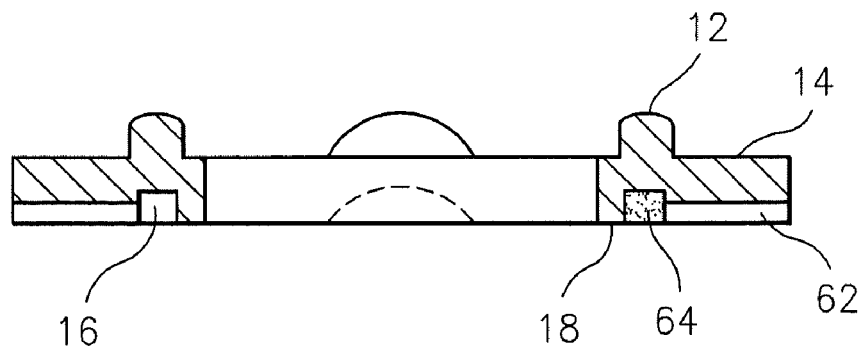
FIG. 2 is a cross-sectional view of the direct tension indicating washer shown in FIG. 1 taken along line 2-2.
Figure 3:
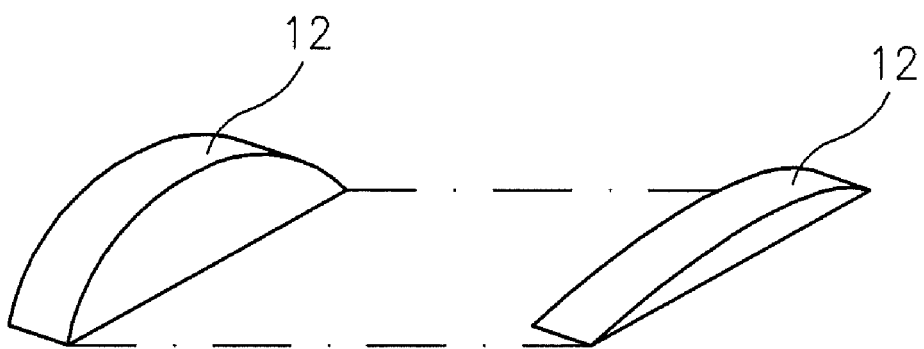
FIG. 3 illustrates compression of convention protuberances during installation of the direct tension indicating washer.
Figure 5:
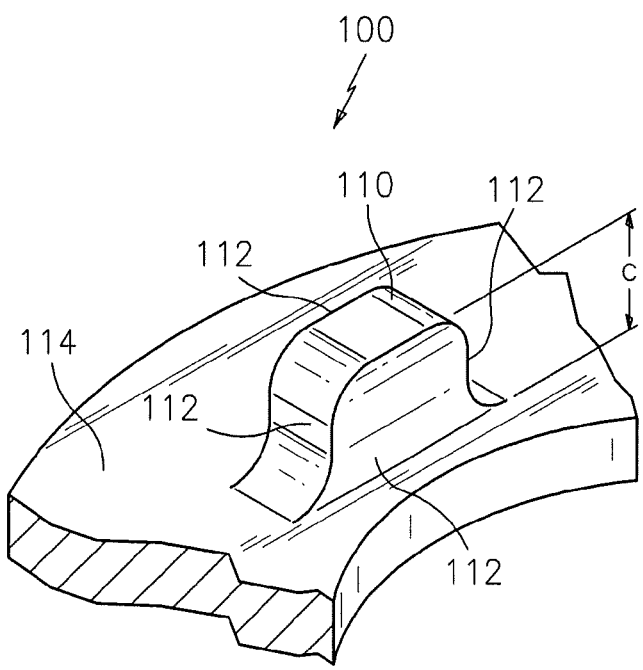
FIG. 5 is a perspective view of a protuberance in embodiments of the invention.

To improve the ability to expel the indicating material 64, a protuberance 110 as shown in FIG. 5 is formed. FIG. 5 illustrates a portion of a direct tension indicating washer 100. Direct tension indicating washer 100 is similar to that shown in FIG. 1, with the exception of the protuberances used. Two aspects of the protuberance 110 are improved in embodiments of the invention. The protuberance 110 is formed using a die having four sides such that all four sides 112 of protuberance 110 have walls that are substantially planar and substantially perpendicular to a top surface 114 of the DTI 100.

Figure 6:
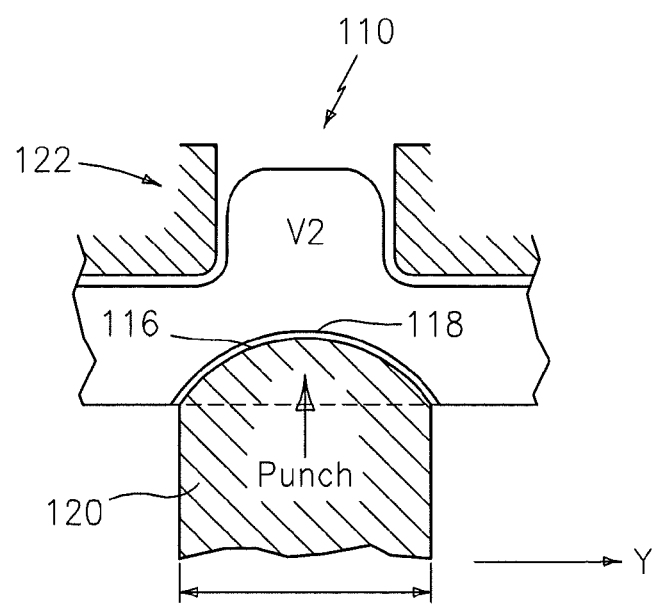
FIG. 6 illustrates the formation of the protuberance of FIG. 5.

Formation of the protuberance 110 is also improved. FIG. 6 illustrates the formation of protuberance 110. The protuberance 110 is formed by a punch 120 which is much wider than the standard punches, so that when the wide punch 120 enters the base metal it causes the metal to flow into a die 122 cavity which constrains the protuberance 110 on four sides. Being thus constrained, the protuberance 110 produced is relatively higher and weaker compared to protuberance 12 of the same volume made with narrower punches. Upon use of the DTI, as the higher and weaker protuberance 110 is compressed, it deflects more easily, and coincidentally causes more interior deformation of the indentation 116. In a sense, protuberance 110 acts more like a piston with a longer stroke, and is therefore capable of ejecting much more indicating material to the outer diameter of the direct tension indicating washer 100. Also, ejection of the indicating material is more predictable as ejection relates to the compression strength of the protuberance.

The indentation 116 is longer than the protuberance 110 as measured in a direction (shown as axis Y) that is transverse to a line running radially from the centroid or center of the direct tension indicating washer 100 to the middle of the protuberance 110. By making the indentation 116 much longer relative to the protuberance 110 length, the protuberance 110 is weaker as it deforms into the indentation 116, which allows for deformation of the upper portion 118 of the indentation 116. The deformation of indentation 116 is primarily at the center of the indentation 116, which has the effect of displacing indicating material precisely where intended as the center of indentation 116 is immediately adjacent to the channel 62 resulting in a very predictable emission of indicating material.

The size of the protuberance 110 is also a factor in generating a predictable squirt event. The protuberance 110 has approximately the same metal volume as that displaced by the punch 120 in forming indentation 116. As shown in FIGS. 5 and 4, the height, c, of protuberance 110 is greater than height, b, of protuberance 12. Further, the volume, V2, of protuberance 110 is greater than the volume, V1, of protuberance 12. This gives protuberance 110 a more piston-like compression when used to more forcefully expel indicating material 64. The volume of indicating material 64 should be approximately equal to the indentation volume. If there is an excess of indicating material 64, the direct tension indicating washer 100 will rotate about the indicating material and not function correctly.

The compression resistance of the protuberance 110 is determined by structural steel application specifications, and must be met by each and every direct tension indicating washer 100. If the protuberances 110 are too small, or low, relative to the indentation volume under them, the compression of the small or low protuberances and the small volume of indicating material 64 affected by protuberance compression sometimes does not result in sufficient deformation of the indentation 116 to eject indicating material in a reliable manner.

Each protuberance 110 on direct tension indicating washer 100 should resist a certain load, or compression resistance, before the indicating material is ejected, and this characteristic is expressed in terms of volume of indicating material/desired compression resistance, expressed as a ratio of cc (volume) per unit of compression resistance (load, or lb). If the volume of indicating material/desired compression resistance is in the range of about $0.7 \times 10^{-6}$ cc per lb to about $0.9 \times 10^{-6}$ cc per lb, there is sufficient indicating material affected by protuberance deflection to make the squirt event predictable and reliable. Conversely, if the volume of indicating material/desired compression resistance is in the range of about $0.4 \times 10^{-6}$ cc per lb to about $0.6 \times 10^{-6}$ cc per lb, there is not sufficient indicating material affected by the protuberance deflection to make the squirt event predictable and reliable.

The shape of protuberances 110 (i.e., having four planar walls) and using a punch 120 which is much wider than the standard punches, so that when the wide punch enters the base metal to the same depth as convention punches it causes the metal to flow into a die 122 cavity which, being constrained on four sides, causes the protuberance 110 to become relatively higher. Being constrained on four sides by the die cavity, the protuberance 110 is relatively higher and yet the indention 116 allows sufficient indicating material to be deposited in the indentation 116 to bring into the volume of indicating material/desired compression resistance of between about $0.7 \times 10^{-6}$ cc per lb and about $0.9 \times 10^{-6}$ cc per lb.

In this process, the compression strength of protuberance 110 is also kept in the necessary range as determined by application specifications. Consequently, when the protuberance 110 is compressed, it deflects in such a way that it affects a greater volume of indicating material, and causes more interior deformation of the indentation which is the primary mechanism of indicating material ejection. As noted above, protuberance 110 acts more like a piston with a longer stroke, and is therefore capable of ejecting much more indicating material to the outer diameter of the direct tension indicating washer.

The direct tension indicating washer 100 also provides for execution of a unique method for determining if a bolt has lost tension. After initial installation, a user may subsequently re-tighten the nut in contact with the direct tension indicating washer 100 to detect the degree to which bolt tension has decreased since initial installation. When the user re-tightens the nut, indicating material will be expelled from channel 62 due to the nut compressing protuberance 110. This is due to the fact that some indicating material remains beneath the protuberance and in the channel after initial installation. If the user turns the nut a small amount (e.g., 3-4 degrees) before the indicating material is expelled on the outer periphery of the direct tension indicating washer 100, this indicates that the bolt has lost a small amount of tension since initial installation. If the user turns the nut a larger amount (e.g., 30-40 degrees) before the indicating material is expelled on the outer periphery of the direct tension indicating washer 100, this indicates that the bolt has lost a larger amount of tension since initial installation.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A direct tension indicating washer comprising:
   a first surface having a protuberance formed thereon;
   a second surface having an indentation formed opposite the protuberance;
   an indicating material positioned in the indentation; and
   a channel leading from the indentation to an outer diameter of the direct tension indicating washer;
   wherein the protuberance has four walls, each of the walls being substantially perpendicular to the first surface.

2. The direct tension indicating washer of claim 1 wherein:
   the protuberance has a desired compression resistance, a volume of indicating material/desired compression resistance is greater than about $0.6 \times 10^{-6}$ cc per lb.

3. The direct tension indicating washer of claim 2 wherein:
   the volume of indicating material/desired compression resistance is within a range of about $0.7 \times 10^{-6}$ cc per lb to about $0.9 \times 10^{-6}$ cc per lb.

4. The direct tension indicating washer of claim 1 wherein:
   the indentation is longer than the protrusion as measured in a direction that is transverse to a line running radially from the centroid of the direct tension indicating washer.

* * * * *